United States Patent
Okubo et al.

(10) Patent No.: US 9,220,020 B2
(45) Date of Patent: *Dec. 22, 2015

(54) USER APPARATUS, BASE STATION APPARATUS, AND METHOD IN MOBILE COMMUNICATION SYSTEM

(75) Inventors: Naoto Okubo, Yokosuka (JP); Hiroyuki Ishii, Yokosuka (JP); Nobuhiko Miki, Yokohama (JP); Kenichi Higuchi, Yokohama (JP); Yoshihisa Kishiyama, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 845 days.

This patent is subject to a terminal disclaimer.

(21) Appl. No.: 12/531,824

(22) PCT Filed: Mar. 13, 2008

(86) PCT No.: PCT/JP2008/054654
§ 371 (c)(1),
(2), (4) Date: Nov. 19, 2009

(87) PCT Pub. No.: WO2008/126623
PCT Pub. Date: Oct. 23, 2008

(65) Prior Publication Data
US 2010/0103891 A1   Apr. 29, 2010

(30) Foreign Application Priority Data
Mar. 20, 2007 (JP) .................................. 2007-073730

(51) Int. Cl.
*H04W 4/00* (2009.01)
*H04W 24/02* (2009.01)
(Continued)

(52) U.S. Cl.
CPC ............... *H04W 24/02* (2013.01); *H04L 1/007* (2013.01); *H04L 1/0013* (2013.01);
(Continued)

(58) Field of Classification Search
USPC ........................................................ 370/329
See application file for complete search history.

(56) References Cited

U.S. PATENT DOCUMENTS

| 2003/0095532 A1* | 5/2003 | Kim et al. ...................... 370/342 |
| 2003/0169769 A1* | 9/2003 | Ho et al. ........................ 370/473 |

(Continued)

FOREIGN PATENT DOCUMENTS

| CN | 1830161 A | 9/2006 |
| EP | 1646163 A2 | 4/2006 |

(Continued)

OTHER PUBLICATIONS

Extended European Search Report for Application No. 08722058.8-2415, mailed on Feb. 16, 2010 (11 pages).

(Continued)

*Primary Examiner* — Sulaiman Nooristany
(74) *Attorney, Agent, or Firm* — Osha Liang LLP

(57) ABSTRACT

A user apparatus transmits an uplink control signal to a base station apparatus using a single carrier scheme. The user apparatus includes: a unit configured to prepare acknowledgement information indicating positive acknowledgement or negative acknowledgement for a downlink data signal based on a result of demodulation of the downlink data signal; a unit configured to prepare channel state information indicating reception quality of a downlink reference signal; a unit configured to channel-code multiplexed control information in which the acknowledgement information and the channel state information are multiplexed to prepare the uplink control signal; and a unit configured to transmit the uplink control signal using dedicated resources different from resources for an uplink data signal.

5 Claims, 14 Drawing Sheets

(51) Int. Cl.
*H04L 1/00* (2006.01)
*H04L 1/16* (2006.01)
*H04L 5/00* (2006.01)

(52) U.S. Cl.
CPC ............ *H04L 1/0026* (2013.01); *H04L 1/0068* (2013.01); *H04L 1/0073* (2013.01); *H04L 1/1671* (2013.01); *H04L 5/0053* (2013.01)

(56) References Cited

U.S. PATENT DOCUMENTS

| | | | |
|---|---|---|---|
| 2003/0185242 A1 | 10/2003 | Lee et al. | |
| 2003/0206524 A1* | 11/2003 | Mohanty et al. | 370/236 |
| 2006/0262870 A1* | 11/2006 | Khan | 375/260 |
| 2007/0041429 A1* | 2/2007 | Khandekar | 375/146 |

FOREIGN PATENT DOCUMENTS

| | | |
|---|---|---|
| EP | 1811701 A2 | 7/2007 |
| JP | 2006-203945 A | 8/2006 |
| JP | 2008-136156 A | 6/2008 |
| KR | 2003-0041728 A | 5/2003 |

OTHER PUBLICATIONS

Qualcomm Europe: "Proposed Structure for UL ACK and CQI" 3GPP Draft; R1-070437, 3rd Generation Partnership Project (3GPP), Mobile Competence Centre; 650, Route Des Lucioles; F-06921 Sophia-Antipolis Cedex; France, vol. RAN WG1, no. Sorrento, Italy; Jan. 10, 2007, XP050104468.
Ericsson: "Uplink Control Signaling for E-UTRA" 3GPP Draft; R1-06011, 3rd Generation Partnership Project (3GPP), Mobile Competence Centre; 650, Route Des Lucioles; F-06921 Sophia-Antipolis Cedex; France, vol. RAN WG1, no. Helsinki, Finland; Jan. 19, 2006, XP050111253.
Extended European Search Report for Application No. 10192700.2, mailed on Feb. 18, 2011 (11 pages).
Ericsson: "Uplink Non-data Associated Control Signaling: Multiplexing from the Same UE" 3GPP Draft; R1-071033, 3rd Generation Partnership Project (3GPP), Mobile Competence Centre; 650, Route Des Lucioles; F-06921 Sophia-Antipolis Cedex; France, vol. RAN WG1, no. St. Louis, USA; Feb. 6, 2007.
Office Action issued Jan. 5, 2012 in corresponding Chinese patent application No. 20080016183.9, with translation, 20 pages.
European Examination Report for Application No. 08722058.8, mailed on Jul. 26, 2010 (5 pages).
NTT Docomo, et al, "Multiplexing Method of Downlink L1/L2 Control Channel with Shared Data Channel in E-UTRA Downlink", 3GPP TSG RAN WG1 Meeting #47, R1-063323, Riga, Latvia, Nov. 6-10, 2006.
European Examination Report for Application No. 08722058.8, mailed on Dec. 14, 2011 (7 pages).
Samsung, "ACK/NACK Signaling Performance", 3GPP TSG-RAN WG1 Rel-6 Ad Hoc, Tdoc R1-040688, Cannes, France, Jun. 21-24, 2004.
Motorola, "E-UTRA Uplink L1/L2 Control Channel Mapping", 3GPP TSG RAN1 #46bis, R1-062626, Seoul, Korea, Oct. 9-13, 2006.
International Search Report w/translation from PCT/JP2008/054654 dated Jul. 1, 2008 (4 pages).
Written Opinion from PCT/JP2008/054654 dated Jul. 1, 2008 (3 pages).
3GPP TSG RAN WG1 Meeting #46bis; R1-062742; "CDM-based Multiplexing Method of Multiple ACK/NACK and CQI for E-UTRA Uplink"; NTT DoCoMo, Inc. et al.; Seoul, Korea; Oct. 9-13, 2006 (6 pages).
Patent Abstracts of Japan; Publication No. 2006-203945 dated Aug. 3, 2006; Samsung Electronics Co. Ltd. (1 page).
Patent Abstracts of Japan; Publication No. 2008-136156 dated Jun. 12, 2008; NTT DoCoMo, Inc. (1 page).
3GPP TSG RAN WG1 Meeting #48; R1-071245; "Approved Report of 3GPP TSG RAN WG1 #47bis V2.0.0 (Sorrento, Italy, Jan. 15-19, 2007"; MCC Support; St. Louis, US; Feb. 12-16, 2007 (119 pages).
Office Action in corresponding Chinese Application No. 200880016183.9 dated Oct. 30, 2013 (13 pages).
Kddi et al.; "CDMA based Multiplexing of ACK/NACK and CQI Control Information in E-UTRA Uplink"; 3GPP TSG RAN WG1 Meeting #47 bis, R1-070521; Sorrento, Italy; Jan. 15-19, 2007 (Original R1-063579) (5 pages).
Extended European Search Report issued in counterpart European application No. 14164177.9 mailed Jun. 5, 2014 (9 pages).
Notice of Preliminary Rejection issued in counterpart Korean Application No. 10-2009-7021366, mailed on Jun. 5, 2014 (8 pages).
Office Action issued in related U.S. Appl. No. 13/785,865, mailed Nov. 5, 2013 (10 pages).
Office Action in counterpart Chinese Patent Application No. 200880016183.9 mailed on Jun. 27, 2014 (17 pages).
Office Action issued Jan. 7, 2015 in related U.S. Appl. No. 13/785,865 (16 pages).
Office Action issued Jan. 27, 2015, in corresponding Korean Application No. 10-2009-7021366 (with translation) (5 pages).
Office Action in corresponding U.S. Appl. No. 13/785,865, dated Apr. 22, 2015 (18 pages).
Office Action in counterpart Chinese Patent Application No. 200880016183.9, dated Aug. 27, 2015 (20 pages).
Office Action in corresponding Chinese Patent Application No. 201310072960.4, dated Jul. 29, 2015 (20 pages).

\* cited by examiner

FIG.4

| C1 | | C2 | C3 | C4 | C5 | | C6 | C7 | | C8 | C9 | C10 | C11 | | C12 |

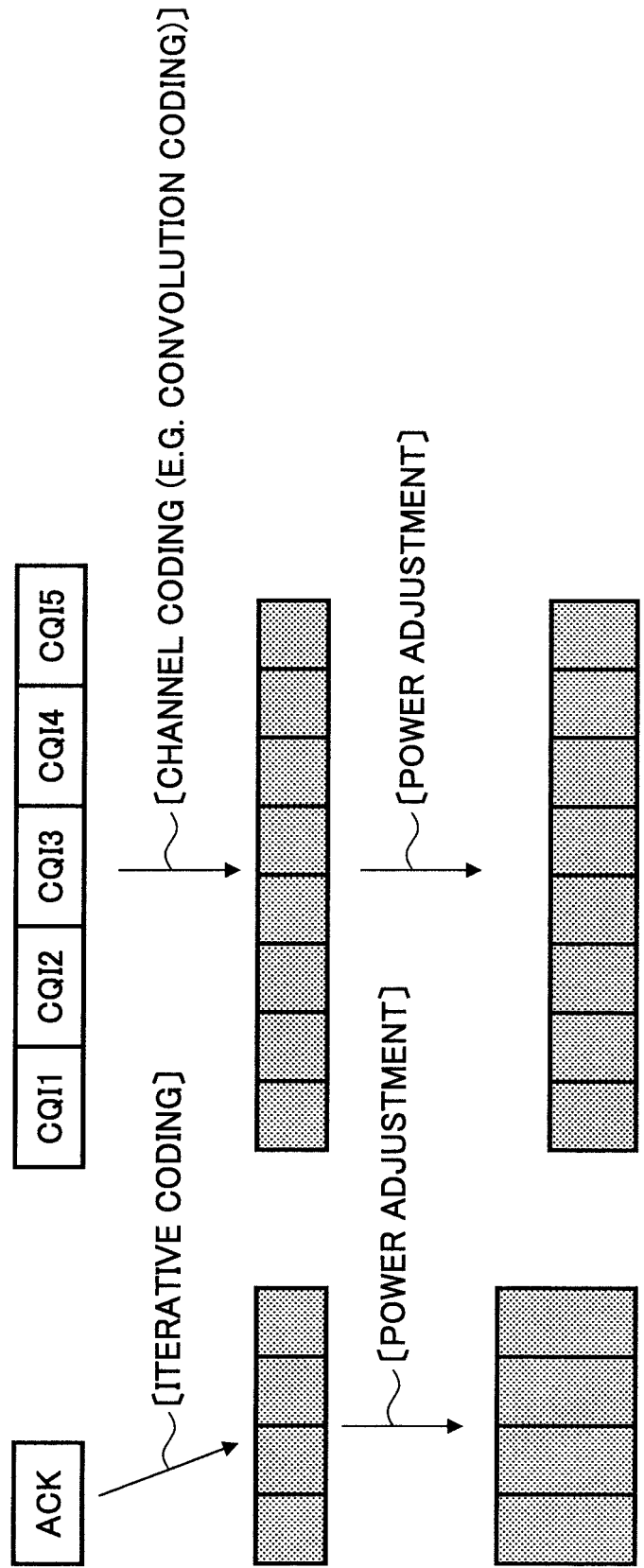

USER APPARATUS, BASE STATION APPARATUS, AND METHOD IN MOBILE COMMUNICATION SYSTEM

TECHNICAL FIELD

The present invention relates to the next generation mobile communication scheme. More particularly, the present invention relates to a user apparatus, a base station apparatus, and a method in the mobile communication system of the next generation mobile communication scheme.

BACKGROUND ART

In this kind of technical field, research and development on the next generation communication system is rapidly progressing. In the communication system considered as of now, from the view point of widening coverage while reducing PAPR (Peak-to-Average Power Ratio), it is proposed to use a single carrier scheme for uplink. In addition, in this communication system, for both of uplink and downlink, radio resources are properly assigned, as a form of a shared channel which is shared by a plurality of users, according to communication states of each user and the like. More particularly, a data signal of a user in the uplink is transmitted by a physical uplink shared channel (PUSCH). A data signal of a user in the downlink is transmitted by a physical downlink shared channel (PDSCH).

Processing for determining the assignment is called scheduling. In order to properly perform scheduling in the uplink, each user apparatus transmits a reference signal (also called as a pilot channel) to a base station, and the base station evaluates the channel state of the uplink based on the reception quality. In addition, in order to perform scheduling in the downlink, the base station transmits a reference signal to the user apparatus, and the user apparatus reports to the base station information indicating channel state (CQI: Channel Quality Indicator) based on the reception quality of the reference signal. Based on the CQI reported from each user apparatus, the base station evaluates the channel state of the downlink to perform scheduling of downlink. The contents of scheduling are transmitted to each user apparatus by a downlink control signal. This control signal is called a downlink L1/L2 control channel or a downlink L1/L2control signal.

The uplink control channel includes CQI information of downlink channel, acknowledgement information (ACK/NACK) of downlink data channel, and information of resource assignment request, and the like. When a resource block (radio resource) is assigned for transmitting an uplink data channel, the uplink control information is transmitted by the resource block. On the other hand, when the uplink data channel is not transmitted, it is considered to transmit the uplink control information by using dedicated resources (dedicated band). In the following, an outline of an example is described in which a band is used in such a way.

FIG. 1 shows a band use example of uplink. FIG. 1 shows resources (a plurality of resource blocks) for transmitting the uplink shared data signal (PUSCH), and shows resources (corresponding to the dedicated band) for a user to which the resources for the PUSCH are not assigned to transmit the uplink control channel. The latter is called a physical uplink control channel (PUCCH). In the example shown in the figure, one or more of four resource blocks are assigned to users, and a first hopping control signal and a second hopping control signal are prepared in a transmission time interval (TTI), and a third hopping control signal and a fourth hopping control signal are prepared in the following TTI. Each hopping control signal corresponds to PUCCH. By performing hopping with respect to time and frequency in TTIs or subframes, diversity effect can be obtained. Each of the first to fourth hopping control signals may be occupied by one user or may be multiplexed by a plurality of users. This type of transmission scheme of the uplink control channel is described in the non-patent document 1.

[Non-patent document 1] 3GPP, R1-071245

DISCLOSURE OF THE INVENTION

Problem to be Solved by the Invention

By the way, various kinds of control information are transmitted by the uplink control channel, and quality and the number of bits which are required by each piece of control information are not the same. CQI is represented by a plurality of bits. The number of bits depends on a numerical range of CQI to be represented. For example, when representing CQI in levels from 0 to 31, five bits are necessary. In addition, in the five bits, the higher the order of the bit is, the more reliably the bit needs to be transmitted. The reason is as follows.

When an error occurs in a higher-order bit, a numerical value represented by the bits includes a large error. On the other hand, as long as the higher-order bit is correct, even when a lower-order bit includes an error, the numerical value to be represented is approximately correct.

Even if the base station erroneously receives CQI, scheduling based on recognition of erroneous channel state is merely performed. Thus, it can be expected that the erroneous reception does not directly lead to deterioration of throughput and the like.

On the other hand, acknowledgement information such as ACK/NACK can be represented essentially by one bit. If the acknowledgement information is NACK, the packet is retransmitted, and if the acknowledgement information is ACK, transmission of a next packet is performed. Therefore, the acknowledgement information has direct effect on whether to retransmit a packet or not, so that the acknowledgement information has direct effect on throughput. Thus, it is desirable that the acknowledgement information is transmitted with remarkably high quality.

For improving error rate of transmitted signals, it is generally available to perform error correction coding (channel coding). As to information represented by many bits such as CQI, the error rate in the base station may be improved by decreasing the coding rate (by increasing redundancy). However, it is difficult to obtain large coding gain for information like acknowledgement information since only one bit is necessary for the information essentially.

However, in conventional technology including the non-patent document 1, sufficient study has not been performed on efficiently transmitting the uplink control channel in consideration of properties of individual kinds of control information.

An object of the present invention is to efficiently transmit a plurality of kinds of control information which are different with each other in required quality and the number of required bits.

Means for Solving the Problem

In the present invention, a user apparatus that transmits an uplink control signal to a base station apparatus using a single carrier scheme is used. The user apparatus includes: a unit configured to prepare acknowledgement information indicating positive acknowledgement or negative acknowledgement for a downlink data signal based on a result of demodulation of the downlink data signal; a unit configured to prepare channel state information indicating reception quality of a downlink reference signal; a unit configured to channel-code multiplexed control information in which the acknowledgement information and the channel state information are multiplexed to prepare the uplink control signal; and a unit configured to transmit the uplink control signal using dedicated resources different from resources for an uplink data signal.

EFFECT OF THE PRESENT INVENTION

According to the present invention, it becomes possible to efficiently transmit a plurality of kinds of control information which are different with each other in required quality and the number of required bits.

BRIEF DESCRIPTION OF THE DRAWINGS

FIG. 4 is a diagram showing a concrete example of information by which long blocks are multiplied;

FIG. 14 is a diagram showing a situation in which acknowledgement information and channel state information are processed separately.

DESCRIPTION OF REFERENCE SIGNS

Figure 1:
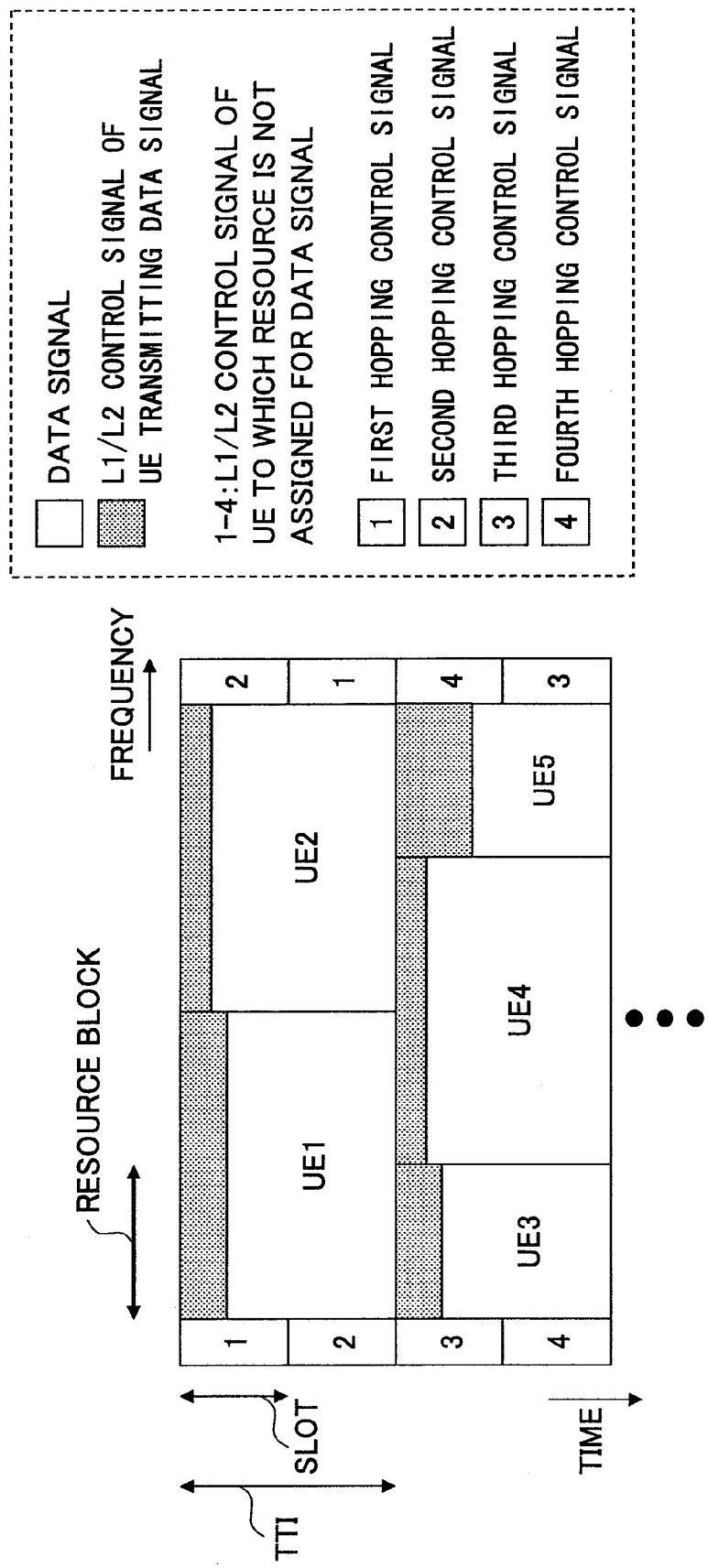
FIG. 1 is a diagram showing a band use example used in the uplink.

302 CQI estimation unit
303 ACK/NACK determination unit
304 control information multiplexing unit
304-1, 2 coding unit
305 coding unit
306 block-by-block modulation pattern generation unit
308 block-by-block modulation unit
310 discrete Fourier transform unit (DFT)
312 subcarrier mapping
314 inverse fast Fourier transform unit (IFFT)
316 cyclic prefix (cp) adding unit
318 multiplexing unit
320 RF transmission circuit
322 power amplifier
324 duplexer
330 code information specifying unit
338 reference signal generation unit
340 transmission power determination unit
350 coding bit multiplexing unit
702 duplexer
704 RF reception circuit
706 reception timing estimation unit
708 fast Fourier transform unit (FFT)
710 channel estimation unit
712 subcarrier demapping unit
714 frequency domain equalizing unit
716 inverse discrete Fourier transform unit (IDFT)
718 demodulation unit
720 decoding unit
721 coding bit demultiplexing unit
722 control information demultiplexing unit
723-1, 2 decoding unit

PREFERRED EMBODIMENTS FOR CARRYING OUT THE INVENTION

For the sake of convenience of explanation, although the present invention is described by being classified into some embodiments, classification into each embodiment is not essential in the present invention, and equal to or more than two embodiments may be used as necessary.

[Embodiment 1]

Figure 2:
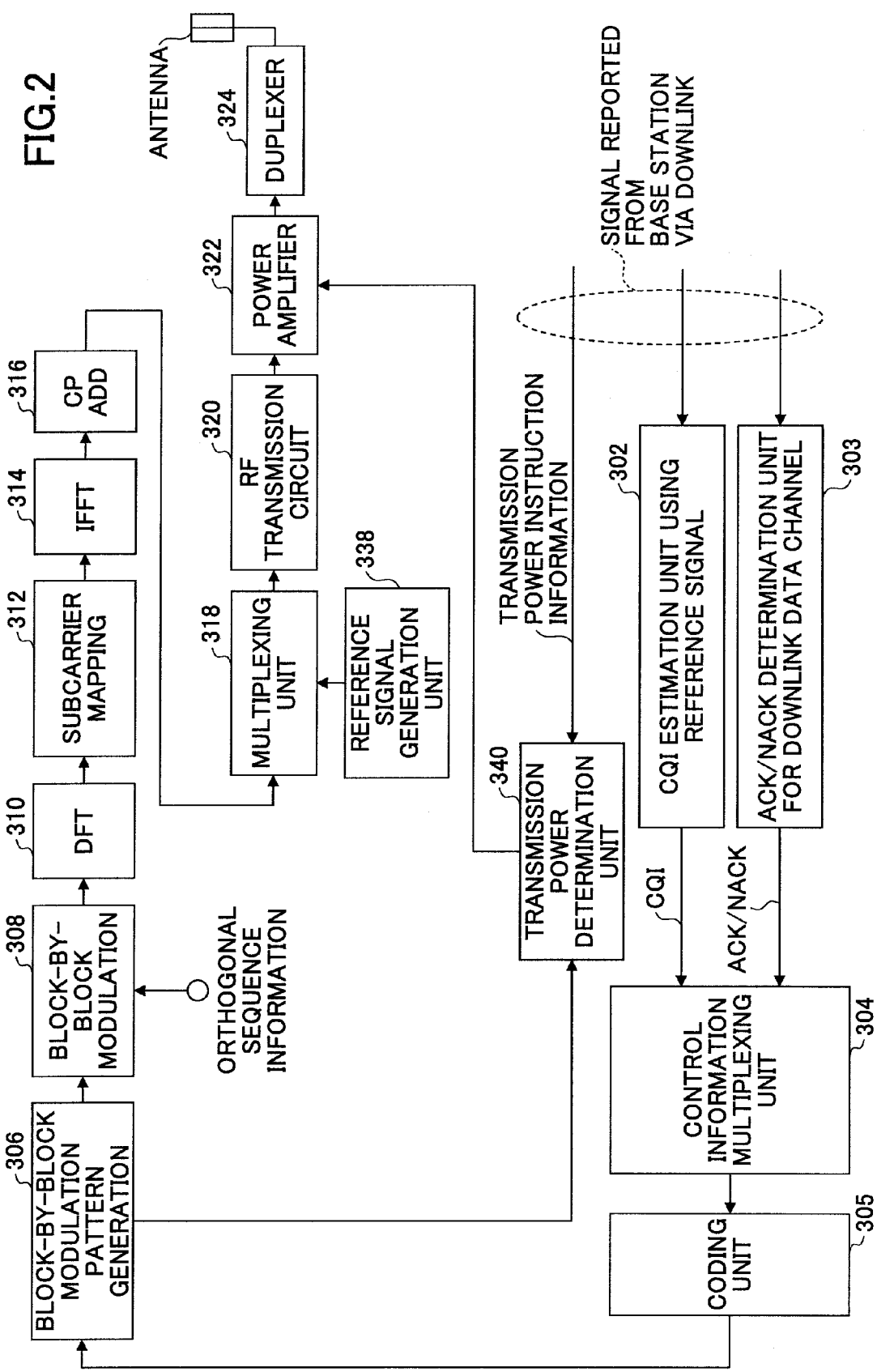
FIG. 2 shows a block diagram of a user apparatus according to a first embodiment of the present invention.

FIG. 2 shows a block diagram of a user apparatus according to an embodiment of the present invention. FIG. 2 shows a CQI estimation unit 302, an ACK/NACK determination unit 303, a control information multiplexing unit 304, a coding unit 305, a block-by-block modulation pattern generation unit 306, a block-by-block modulation unit 308, a discrete Fourier transform unit (DFT) 310, a subcarrier mapping unit 312, inverse fast Fourier transform unit (IFFT) 314, a cyclic prefix (CP) adding unit 316, a multiplexing unit 318, an RF transmission circuit 320, a power amplifier 322, a duplexer 324, a reference signal generation unit 338, and a transmission power determination unit 340.

The CQI estimation unit 302 measures an amount indicating downlink channel state, that is, measures channel quality indicator (CQI), and outputs it. For example, the channel state information is derived by measuring reception quality (which may be represented by SIR, SINR, etc.) of a reference signal transmitted from the base station, and by converting the measurement value into a predetermined numerical value. For example, a measured reception quality (SIR) is converted to a value indicating a level of 32 levels, so that CQI which can be represented by five bits may be derived.

The ACK/NACK determination unit 303 determines whether there is an error in each of packets that form the received downlink data channel, and outputs a determination result as acknowledgement information. The acknowledgement information may be represented as positive acknowledgement (ACK) indicating there is no error or negative acknowledgement (NACK) indicating there is an error. Since it is only necessary that the acknowledgement information can represent presence or absence of an error in the received packet, the acknowledgement information can be represented essentially by one bit. But, the acknowledgement information may be represented by a larger number of bits.

The control information multiplexing unit 304 multiplexes information representing CQI and acknowledgement information (ACK/NACK) to output multiplexed control information ("multiplex" may be also represented as "concatenate" or "combine"). For example, when CQI is represented by five bits and the acknowledgement information is represented by one bit, the multiplexed control information is represented by six bits.

The coding unit 305 performs channel coding on the multiplexed control information. Channel coding may be performed using various proper methods which are known in this technical field. For example, convolution coding, Turbo coding, and Reed Muller coding and the like may be performed. The coding unit 305 may puncture a channel-coded signal as necessary to adjust transmission rate or quality. In this case, puncturing may be performed such that only bits corresponding to CQI are extracted. Further, puncturing may be performed such that lower bits of CQI are extracted as much as possible.

The block-by-block modulation pattern generation unit 306 shapes each of channel state information (CQI) and acknowledgment information (ACK/NACK) into a block-by-block modulation pattern. The block is an information unit that forms subframes, and the subframe forms a transmission time interval (TTI) which includes a plurality of slots.

Figure 3:
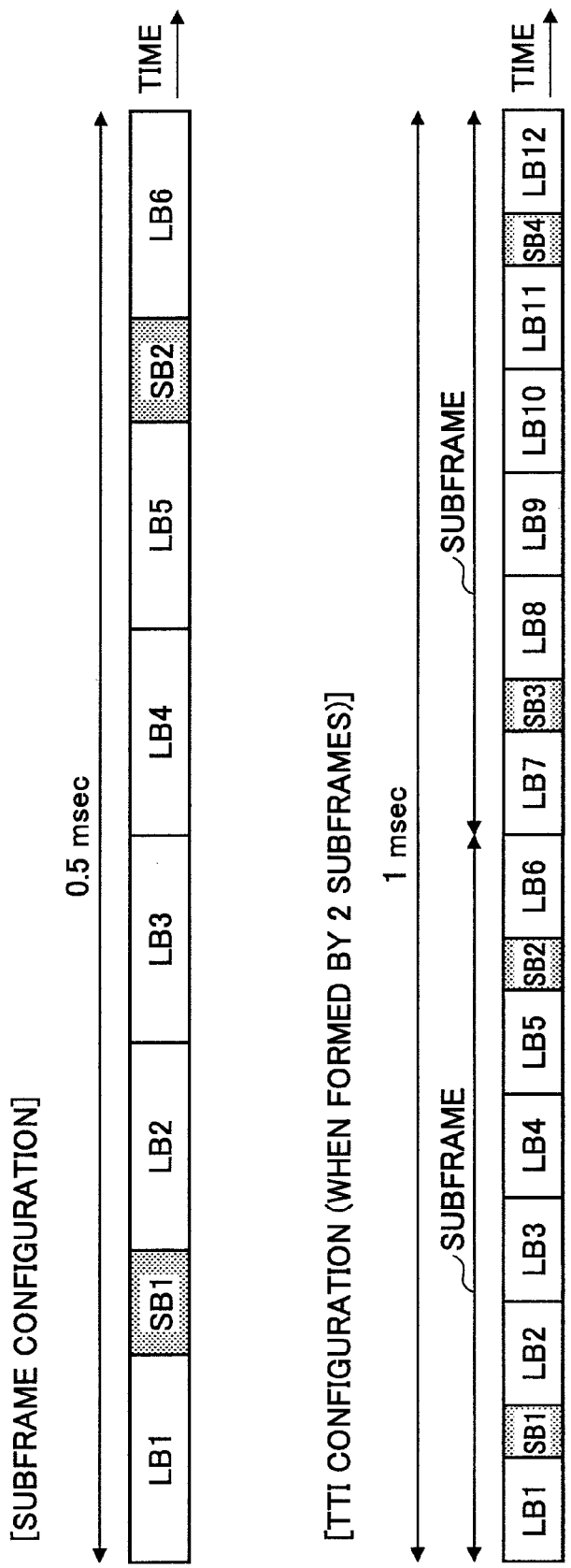
FIG. 3 is a diagram showing examples of TTI, subframe and block.

FIG. 3 shows examples of the subframe and the TTI. In the examples shown in the figure, TTI of 1.0 ms includes two subframes each being 0.5 ms, and each subframe includes six long blocks (LB) and two short blocks (SB). The long block is 66.7 µs, for example. The short block is 33.3 µs, for example. The numerical values are merely examples, and can be changes as necessary. Generally, the long block is used for transmitting data (control signal, data signal and the like) which is unknown for the receiving side, and the short block is used for transmitting data (reference signal and the like) which is known to the receiving side. In the example shown in the figure, one TTI includes 12 long blocks (LB1-LB12) and 4 short blocks (SB1-SB4).

The block-by-block modulation pattern generation unit 306 shown in FIG. 2 determines correspondence relationship between 12 blocks (LB1-LB12) in the subframe and coding bits.

Figure 4:
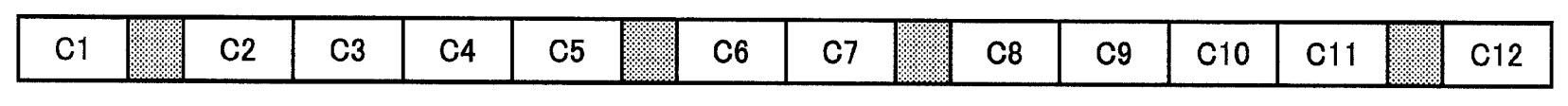

In FIG. 4, multiplexed control information on which channel coding has been performed is mapped to each block forming a subframe. In the example shown in the figure, Ck(k=1~12) indicates coding bits in the case when CQI and ACK/NACK are combined, multiplexed, and then coded.

As mentioned above, the block-by-block modulation pattern generation unit 306 shown in FIG. 2 prepares one factor for each of 12 blocks, and prepares 12 factors (first factor to twelfth factor) in total per one TTI.

The block-by-block modulation unit 308 multiplies, by the first factor, all chips of the Constant Amplitude Zero Autocorrelation (CAZAC) code sequence (the chip length can be associated with one long block) assigned to the user apparatus, and multiplies the same CAZAC code sequence by the second factor. Similarly, the block-by-block modulation unit 308 multiplies all chips of the CAZAC code sequence by the twelfth factor, so as to derive an information sequence to be transmitted by one TTI. The CAZAC code sequence commonly used for all blocks is an orthogonal code sequence assigned to a residing cell for identifying user apparatuses. Properties of the CAZAC code are described later.

Information on CAZAC code is provided to the block-by-block modulation unit 308 as orthogonal sequence information. The orthogonal sequence information includes code information on CAZAC code sequence (sequence number) used by the user apparatus, cyclic shift amount of the CAZAC code sequence, and transmission band. The code information may be derived from broadcast information from the broadcast channel, or may be individually reported from the base station. Individual report may be performed by upper layer signaling such as signaling by a L3 control channel, for example.

The discrete Fourier transform unit (DFT) 310 performs discrete Fourier transform to transfer time series information into information of the frequency domain.

The subcarrier mapping unit 312 performs mapping in the frequency domain. Especially when the frequency division multiple access (FDM) scheme is used for multiplexing a plurality of user apparatuses, the subcarrier mapping unit 312 performs mapping of signals based on bands set in the frequency setting unit 336. There are two types of FDM schemes which are a localized FDM scheme and a distributed FDM scheme. In the localized FDM scheme, a continuous band is assigned for each individual user on the frequency axis. In the distributed FDM scheme, a downlink signal is generated such that the signal includes discontinuous frequency components over a wide band (over the whole of the specific band $F_{RB2}$ for uplink control signal).

The inverse fast Fourier transform unit (IFFT) 314 restores the signal of the frequency domain into a signal of the time domain by performing inverse Fourier transform.

The cyclic prefix (CP) adding unit 316 adds a cyclic prefix (CP) to information to be transmitted. The cyclic prefix (CP) functions as a guard interval for absorbing multipath propagation delay and for absorbing differences of reception timing among a plurality of users in the base station.

The multiplexing unit 318 multiplexes the reference signal into information to be transmitted so as to generate a transmission symbol. The reference signal is transmitted by the short block (SB1, SB2) shown in the frame configuration of FIG. 3.

The RF transmission circuit 320 performs processing such as digital-analog conversion, frequency conversion, band limitation and the like for transmitting the transmission symbol by a radio frequency.

The power amplifier 322 adjusts transmission power.

The duplexer 324 properly separates a transmission signal and a received signal such that simultaneous communication is realized.

In the following, an outline of the CAZAC code is described.

Figure 5:
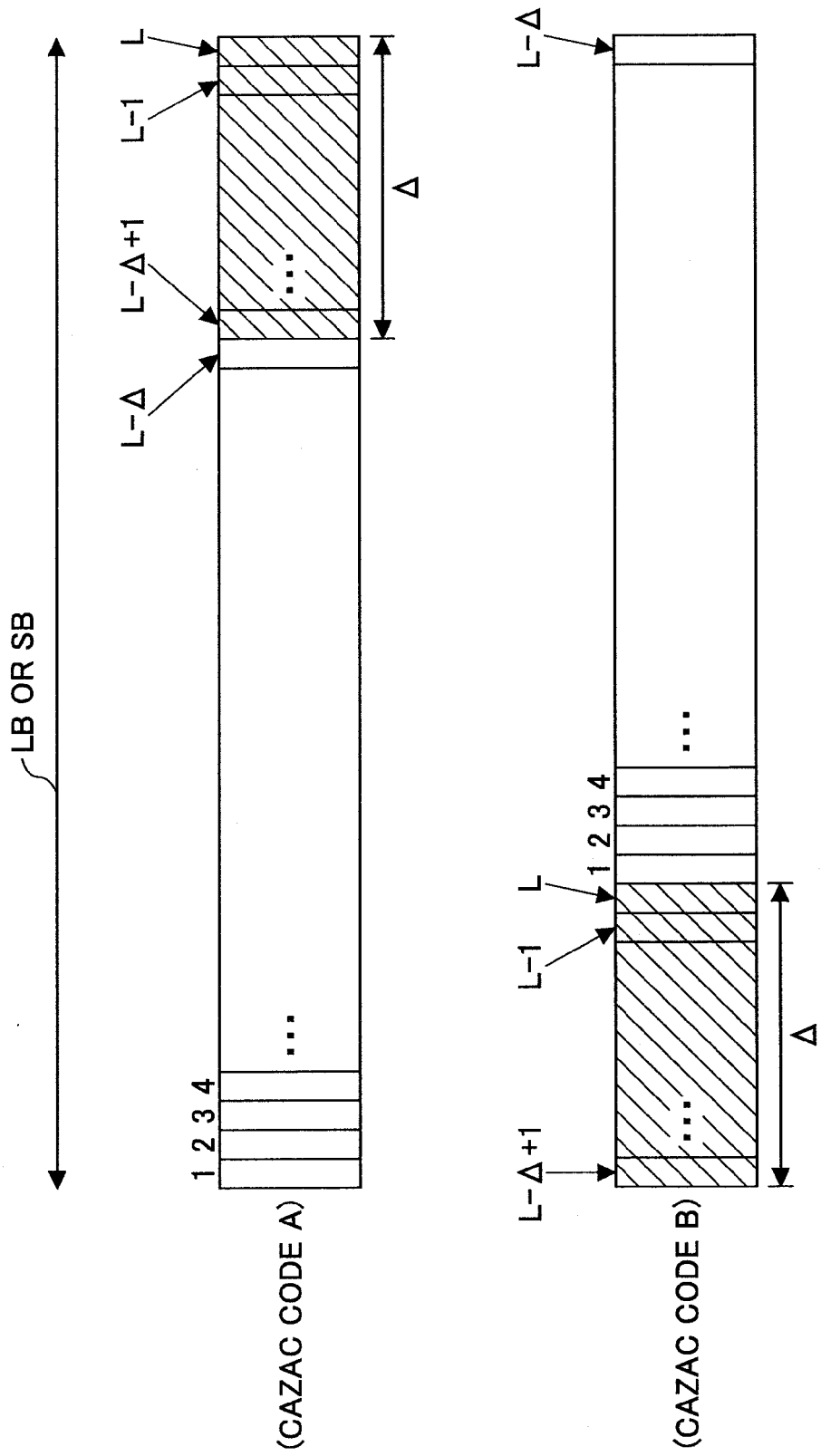
FIG. 5 is a diagram for explaining properties of Constant Amplitude Zero Auto-correlation (CAZAC) code.

As shown in FIG. 5, it is assumed that a code length of a CAZAC code A is L. For the sake of convenience of explanation, although it is assumed that the code length corresponds to a time duration of L samples or L chips, such assumption is not essential for the present invention. Another code B is generated by moving a series of Δ samples (shaded area in the figure) including the last sample (L-th sample) of the CAZAC code A to the top of the CAZAC code A as shown in the lower side of FIG. 5. In this case, the CAZAC codes A and B are orthogonal to each other with respect to Δ=0~(L−1). That is, a CAZAC code is orthogonal to a code obtained by cyclically shifting the CAZAC code. Therefore, when one sequence of a CAZAC code of the code length L is prepared, L codes which are orthogonal to each other can be prepared theoretically. A CAZAC code A is not orthogonal to another CAZAC code C that cannot be obtained by cyclically shifting the CAZAC code A. However, a cross-correlation value between the CAZAC code A and a random code which is not a CAZAC code is remarkably greater than a cross-correlation value between the CAZAC code A and the CAZAC code C. Thus, CAZAC code is preferable also from the viewpoint of reducing cross-correlation amount (interference amount) between non-orthogonal codes.

In the present embodiment, each user apparatus uses a CAZAC code selected from among a group of CAZAC codes having such properties (a code sequence group derived by cyclically shifting a CAZAC code). In the present embodiment, among L codes that are orthogonal to each other, $L/L_A$ codes obtained by cyclically shifting a basic CAZAC code by $\Delta = n \times L_A$ are actually used as reference signals of mobile stations (n=0, 1, . . . , $(L-1)/L_A$). $L_A$ is an amount determined based on a multipath propagation delay amount. In doing this way, orthogonal relationship can be maintained in uplink control channels transmitted from individual user apparatuses even under a multipath propagation environment. Details of the CAZAC code are described in D. C. Chu, "Polyphase codes with good periodic correlation properties", IEEE Trans. Inform. Theory, vol. IT-18, pp. 531-532, July 1972; 3GPP, R1-050822, Texas Instruments, "On allocation of uplink sub-channels in EUTRA SC-FDMA", for example.

The reference signal generation unit 338 in FIG. 2 prepares a reference signal to be included in the uplink control channel. As mentioned above, the reference signal is transmitted using the short block (SB1,SB2) in the frame configuration shown in FIG. 3. The reference signal is also formed by a CAZAC code assigned to each user apparatus. The CAZAC code for the reference signal may be also specified by a sequence number and a cyclic shift amount.

Generally, the long block (LB) and the short block (SB) are different in length, in time duration, or in number of chips, a CAZAC code $C_L$ included in the long block (LB) and a CAZAC code $C_S$ included in the short block (SB) may be prepared separately. However, since both of them are used for a same user apparatus, there may be a relationship between the CAZAC codes $C_L$ and $C_S$ (for example, a part of $C_L$ may form $C_S$).

The transmission power determination unit 340 adjusts power (power density per unit band) of a transmission signal based on transmission power instruction information from the block-by-block modulation pattern generation unit 306 and the base station.

Figure 6:
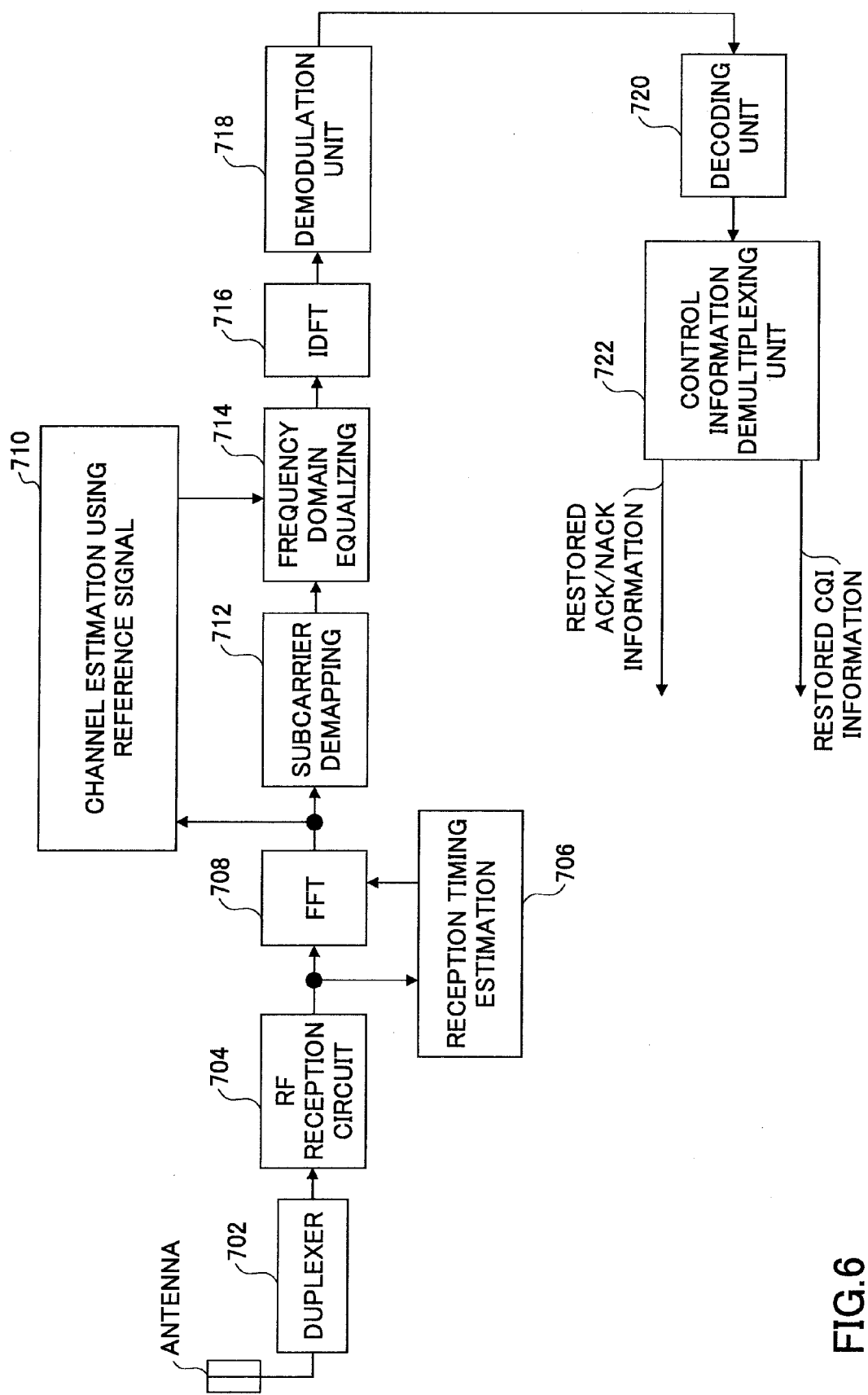
FIG. 6 shows a block diagram of a base station apparatus according to a first embodiment of the present invention.

FIG. 6 shows a base station apparatus according to an embodiment of the present invention. FIG. 6 shows a duplexer 702, an RF reception circuit 704, a reception timing estimation unit 706, a fast Fourier transform unit (FFT) 708, a channel estimation unit 710, a subcarrier demapping unit 712, a frequency domain equalizing unit 714, an inverse discrete Fourier transform unit (IDFT) 716, a demodulation unit 718, a decoding unit 720 and a control information demultiplexing unit 722.

The duplexer 702 properly separates between a transmission signal and a received signal such that simultaneous communication is realized.

The RF reception circuit 704 performs processing such as digital analog conversion, frequency conversion, band limitation and the like for processing the received symbol in baseband.

The reception timing estimation unit 706 specifies reception timing based on a synchronization channel or a pilot channel in a received signal.

The fast Fourier transform unit (FFT) 708 performs Fourier transform to convert time series information to information in the frequency domain.

The channel estimation unit 710 estimates a channel state in the uplink based on reception state of the uplink pilot channel, and outputs information for performing channel compensation.

The subcarrier demapping unit 712 performs demapping in the frequency domain. This processing is performed in response to mapping in the frequency domain performed in the individual user apparatuses.

The frequency domain equalizing unit 714 performs equalization of the received signal based on the channel estimation value.

The inverse discrete Fourier transform unit (IDFT) 716 restores a frequency domain signal into a time domain signal by performing inverse discrete Fourier transform.

The demodulation unit 718 demodulates the received signal. As to the present invention, an uplink control channel is demodulated, so that the demodulation unit 718 outputs channel state information (CQI) of downlink channel and/or acknowledgement information (ACK/NACK) for downlink data signal.

The decoding unit 720 decodes a signal on which data demodulation has been performed. In the present embodiment, since error correcting coding has been performed on the multiplexed control signal in which channel state information and acknowledgement information are multiplexed, the signal decoded by the decoding unit 720 represents the multiplexed control signal in which the channel state information and the acknowledgement information are multiplexed.

The control signal demultiplexing unit 722 separates the channel state information and the acknowledgement information from the decoded multiplexed control information, and outputs them.

Although not shown in the figure, the acknowledgement information is used for retransmission control. When the acknowledgement information indicates ACK, a next new packet is prepared. When the acknowledgement information indicates NACK, a retransmission packet is prepared. The channel state information is used by the scheduler. The scheduler determines assignment of the radio resources in the downlink based on quality of the channel state information (CQI) of the downlink channel and other criteria. In addition, the scheduler determines uplink resource assignment based on reception state of the reference signal transmitted from each user apparatus and other criteria. The determined information is output as scheduling information. The scheduling information specifies frequency, time, transmission format (data modulation scheme and channel coding rate etc.) and the like used for transmitting signals.

Figure 7:
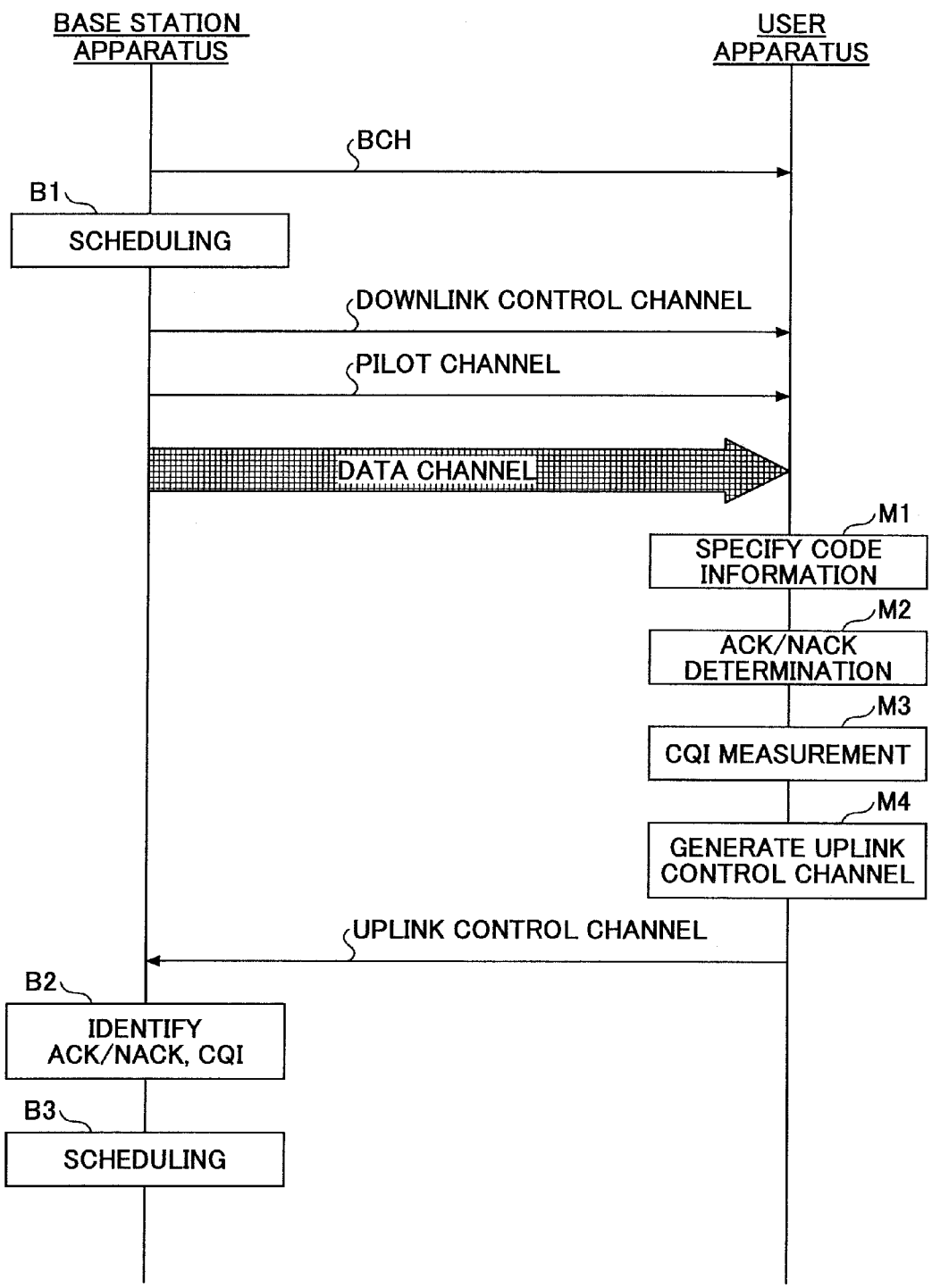
FIG. 7 is a flowchart showing an operation procedure of the present invention.

FIG. 7 shows an operation procedure according to an embodiment of the present invention. In this operation example, general code information related to all user apparatuses are transmitted by the broadcast channel (BCH). Each user apparatus uniquely derives code information specific to the own apparatus from the broadcast information. The general code information may include information indicating that there are N CAZAC code sequences (C#1, C#2, . . . , C#N) used in the cell, there are M cyclic shift amounts (0, $L_A$, . . . , $(M-1) \times L_A$) for each sequence, and that frequency division multiplexing (FDM) scheme is used and there are F available bandwidths (Bw1, Bw2, . . . , BwF), and the like.

In step B1, the base station apparatus performs downlink scheduling, and the base station apparatus sends a downlink control channel (L1/L2 control channel), a downlink data channel and a pilot channel to the user apparatus.

In step M1, the user apparatus specifies information (code information for the user apparatus) related to the code used for an uplink control channel based on information included in the downlink control channel.

Figure 8:
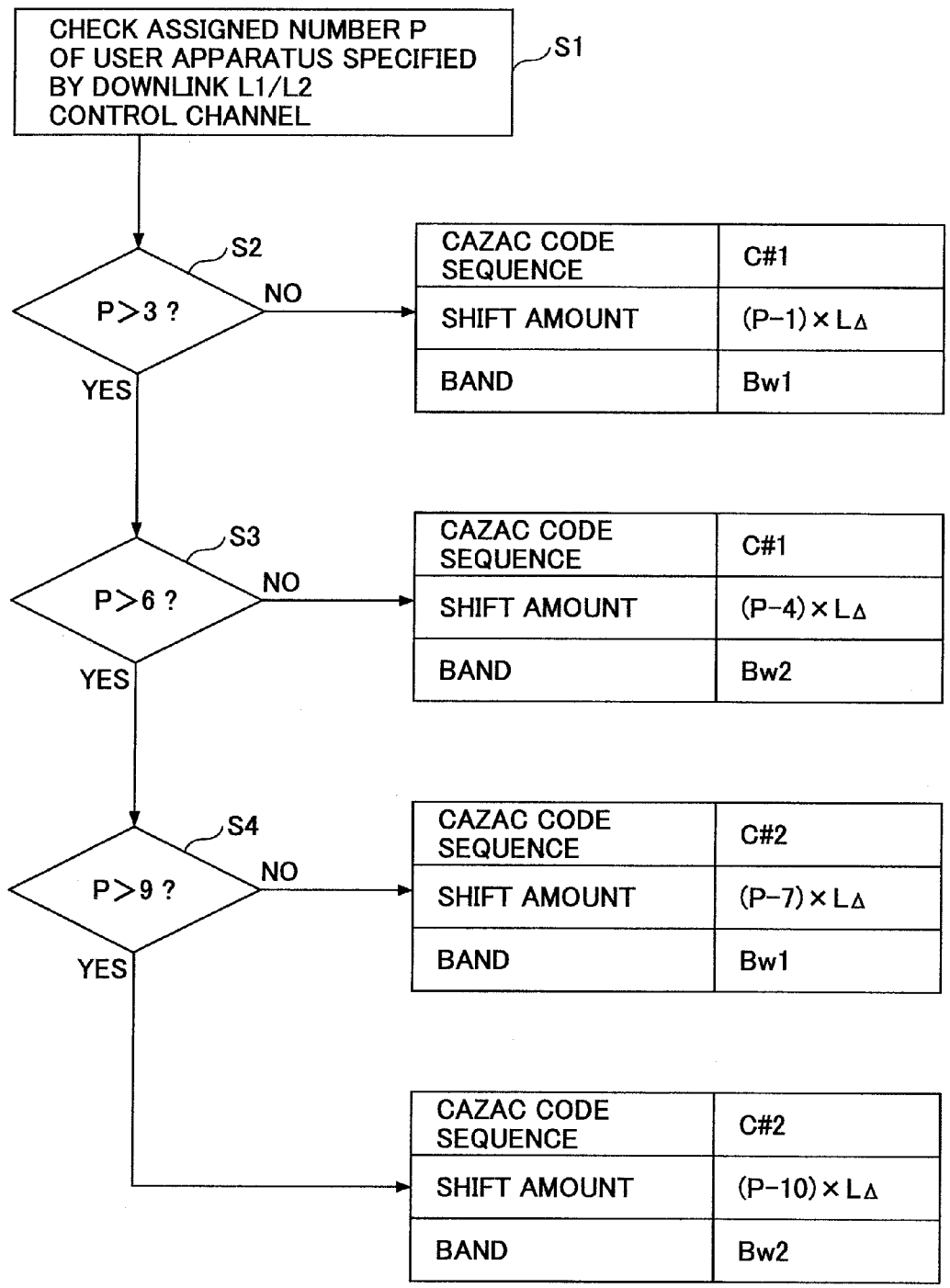
FIG. 8 is a flowchart for specifying code information from broadcast information and assigned number.

FIG. 8 shows an example of a method for specifying code information that may be used in step M1. For the sake of simplicity, it is assumed that two CAZAC code sequences (C#1, C#2) are prepared, three cyclic shift amounts (0, $L_A$, $2L_A$) are prepared for each sequence, and that two available bands (Bw1, Bw2) are prepared. Therefore, 2×3×2=12 user apparatuses can be identified. The numbers are merely examples, and other proper numbers may be used.

In step S1, the user apparatus recognizes an assigned number P(=1, 2, ..., 12) of the user apparatus specified in the downlink L1/L2 control channel.

In step S2, the user apparatus determines whether the assigned number p is greater than 3 or not. When the determination result is No (when p=1, 2 or 3), the sequence number is specified as C#1, the shift amount is specified as $(P-1) \times L_A$, and the band is specified as Bw1. When the assigned number is greater than 3, the process flow goes to step S3.

In step S3, the user apparatus determines whether the assigned number p is greater than 6 or not. When the determination result is No (when p=4, 5 or 6), the sequence number is specified as C#1, the shift amount is specified as $(P-4) \times L_A$, and the band is specified as Bw2. When the assigned number is greater than 6, the process flow goes to step S4.

In step S4, the user apparatus determines whether the assigned number p is greater than 9 or not. When the determination result is No (when p=7, 8 or 9), the sequence number is specified as C#2, the shift amount is specified as $(P-7) \times L_A$, and the band is specified as Bw1. When the assigned number is greater than 9 (when p=10, 11 or 12), the sequence number is specified as C#2, the shift amount is specified as $(P-10) \times L_A$, and the band is specified as Bw2.

Figure 9:
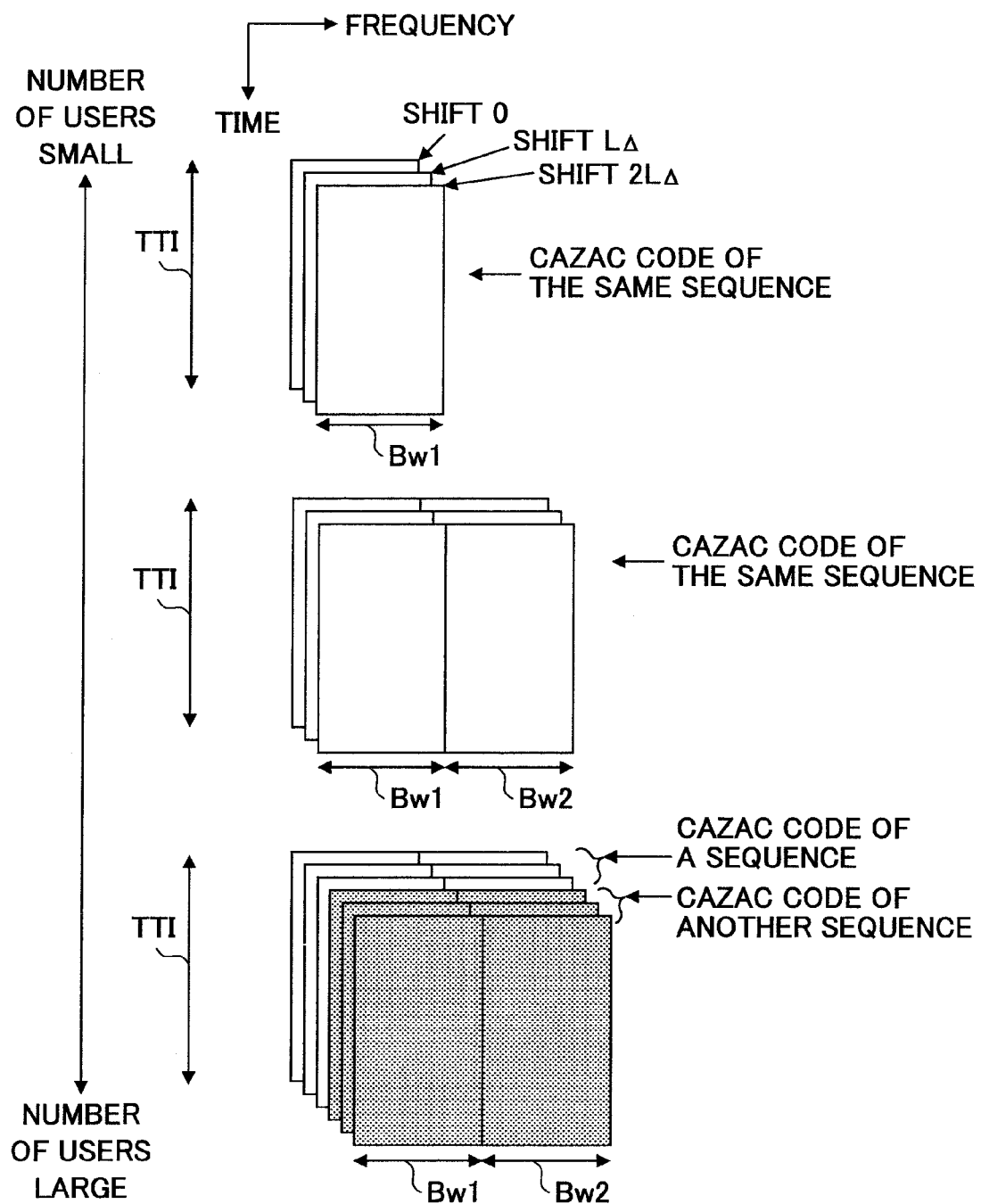
FIG. 9 is a diagram showing setting examples of CAZAC codes, cyclic shift amounts and bands realized by executing the flow shown in FIG. 8.

FIG. 9 shows examples of CAZAC codes, cyclic shift amounts and bands realized by executing the flow shown in FIG. 8. As shown in the figure, users are multiplexed using a code division multiplexing (CDM) scheme using a CAZAC code of a same sequence, first. As the number of users increases, users are code-multiplexed using the same CAZAC code sequence in another band. After that, CDM is performed in each available band. In other words, although CDM and FDM are performed, CDM is given preference. In the case when multiplexing users the number of which is greater than the number of users that can be identified by code division multiplexing using a CAZAC code sequence and by frequency division multiplexing, another CAZAC code sequence is prepared, and users are multiplexed by CDM and FDM.

Assuming that N CAZAC code sequences (C#1, C#2, ..., C#N) are prepared, M cyclic shift amounts (0, $L_A$, ..., $(M-1) \times L_A$) are prepared, frequency division multiplexing scheme (FDM) is used, and that F available bands (Bw1, Bw2, ..., BwF) are prepared, the sequence number of CAZAC code is represented as a value of (P/(M×F)) in which a fractional portion is round up, a ((P−(n−1)×(M×F))/M)-th band is used, and the cyclic shift amount is represented as (P−((n−1)×(M×F))−(f−1)×M=Pmod M) times $L_A$.

In the example described with reference to FIGS. 8 and 9, the user apparatus starts to use another band Bw2 at the time when the assigned number or the number of multiplexed users exceeds three. However, even when the number of multiplexed users is greater than 3 and equal to or less than 6, it can be considered to use the same band Bw1, and instead, use another CAZAC code sequence C#2. The CAZAC codes C#1 and C#2 are not orthogonal to each other in which one cannot be derived from another by cyclically shifting. However, the reason to use C#1 and C#2 is that the cross-correlation value is relatively small.

As mentioned above, code information of each user apparatus can be specified from the broadcast information and the assignment information p. The specified code information is provided to the block-by-block modulation unit 308 shown in FIG. 2.

In step M2 in FIG. 7, the user apparatus determines presence or absence of an error for each packet of the downlink data channel. For example, the error detection may be performed using the cyclic redundancy check (CRC) method, or any other proper error detection method known in this technical field may be used. The user apparatus determines positive acknowledgement ACK which indicates there is no error (or within a permissible range even if there is an error) or negative acknowledgement NACK which indicates there is an error, for each packet. The ACK and the NACK form the acknowledgment information.

In step M3, the user apparatus measures reception quality of the downlink pilot channel, and converts the measurement value to a numerical value within a range to derive the channel state information (CQI). For example, in the case when the reception quality is represented as 32 levels, the user apparatus converts the measurement result to a numerical value indicating what level the current reception quality (SIR and the like) is, so that CQI that can be represented by 5 bits is derived.

It is not essential that the steps M2 and M3 are performed in this order. The determination of the acknowledgement information and the measurement of the channel state information may be performed at any proper time.

In step M4, the user apparatus generates an uplink control channel for reporting, to the base station, both or one of the acknowledgement information (ACK/NACK) or the channel state information (CQI).

Figure 10:
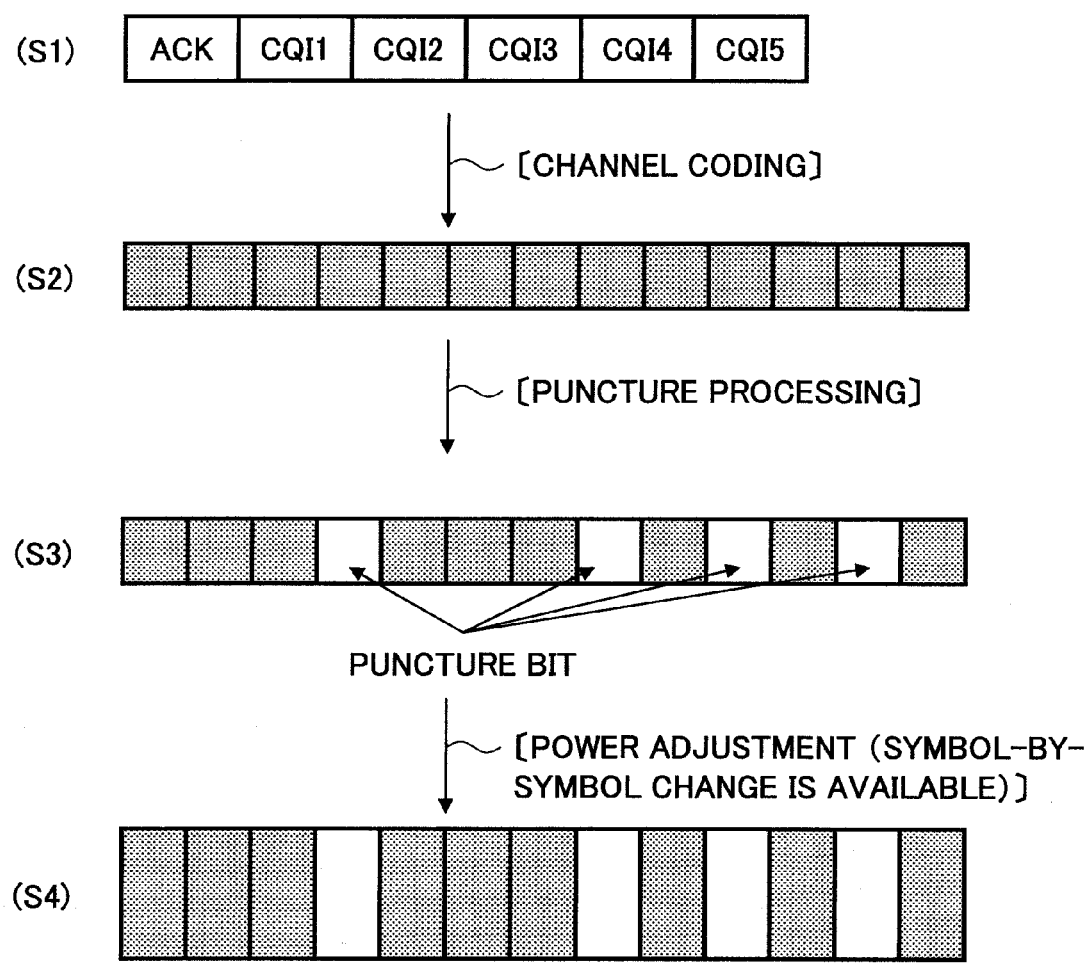
FIG. 10 is a diagram showing a situation in which acknowledgement information and channel state information are processed.

FIG. 10 shows how the acknowledgement information and the channel state information are processed. In step S1, the acknowledgement information and the channel state information are multiplexed, so that a multiplexed control signal having a length that is equal to the sum of the numbers of bits of the acknowledgement information and the channel state information is prepared. In step S2, the multiplexed control signal is channel-coded. In step S3, puncturing is performed on the bit sequence on which channel-coding has been performed as necessary. Generally, puncturing is performed in order to adjust transmission rate or quality. However, in the present embodiment, puncturing may be performed such that only bits corresponding to CQI are extracted. In addition, puncturing may be performed such that lower-order bits of CQI are extracted as much as possible. In step S4, power of each symbol (power density per unit band) is adjusted. In the example shown in the figure, although all symbols have the same power, power may be adjusted for each symbol.

As mentioned above, the block-by-block modulation pattern generation unit shown in FIG. 2 prepares one factor for each of 12 blocks, so that 12 factors (first factor-twelfth factor) are prepared for one TTI in total. The 12 factors represent the acknowledgement information and the channel state information. The uplink control channel has a frame structure shown in FIGS. 3 and 4.

For example, the first long block (LB1) is generated by multiplying the whole CAZAC code sequence (cyclically shifted) by the first factor. The second long block (LB2) is generated by multiplying the same CAZAC code sequence by the second factor. After that, in the same way, a K-th long block (LBK) is generated by multiplying the same CAZAC code by the K-th factor. Accordingly, a frame for the uplink control channel including 12 long blocks is generated. More properly, the frame includes a reference signal formed by a CAZAC code.

The uplink control channel generated in this way is transmitted from the user apparatus to the base station using a dedicated band (PUCCH).

In step B2, the base station apparatus receives the uplink control channels from a plurality of user apparatuses, and demodulates and decodes the channels. Each user apparatus transmits a similar uplink control channel. But, the uplink control channels use a CAZAC code sequence having different cyclic shift amounts, different bands, or CAZAC code of different sequences.

As mentioned above, since the whole CAZAC code is merely multiplied by one factor in each long block, the base station apparatus can add uplink control channels received from each user apparatus in phase. Therefore, orthogonality among CAZAC codes of the same sequence having different cyclic shift amounts is not collapsed. Thus, the base station apparatus can orthogonally separates signals sent from each user apparatus. Even when non-orthogonal CAZAC code is used, the user apparatus can be identified with lower interference level as compared with the case in which a random sequence is used. Further, by determining the contents of the first to twelfth factors used for the uplink control channel for each user apparatus, contents of acknowledgement information and/or channel state information can be identified.

Further, the control signal separated for each user apparatus is data-demodulated and decoded. The signal which is decoded is further separated into the acknowledgement information and the channel state information.

In step B3, the base station apparatus performs processing such as retransmission control and resource assignment based on the acknowledgement information (ACK/NACK) and/or the channel state information (CQI) reported from the user apparatus by the uplink control channel.

In the present embodiment, the acknowledgement information and the channel state information are combined (multiplexed), and the combined signal is channel-coded collectively. Since the information unit to be channel-coded becomes large, coding gain increases, so that error correcting capability can be enhanced. The present embodiment is especially preferable from the viewpoint of enhancing error tolerance of the acknowledgement information.

[Embodiment 2]

Figure 11:
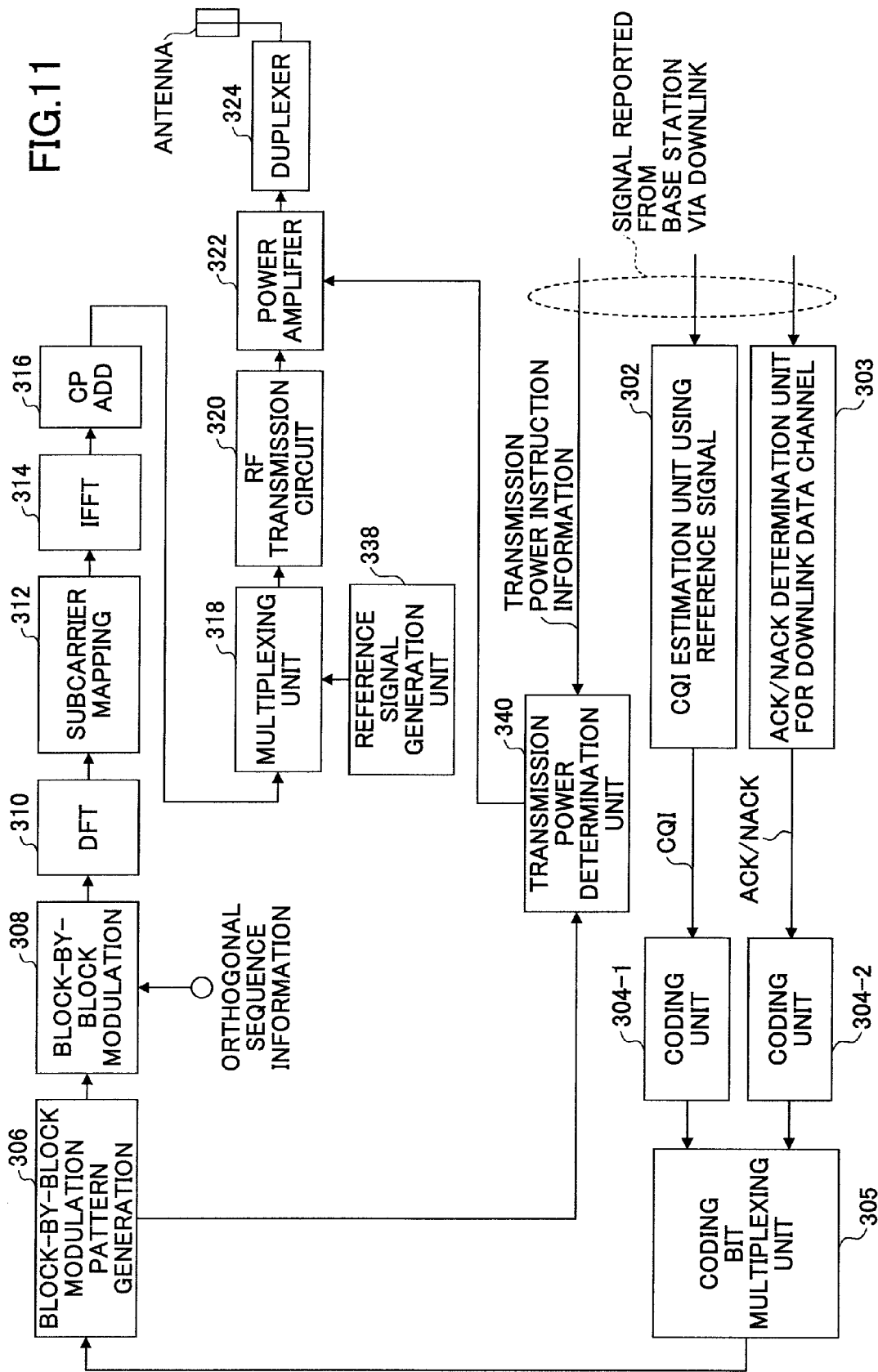
FIG. 11 shows a block diagram of the user apparatus according to a second embodiment of the present invention.

FIG. 11 shows a block diagram of the user apparatus according to a second embodiment of the present invention. Generally, FIG. 11 is similar to FIG. 2 in which same reference numbers are assigned to the same processing blocks, and repeated description is not given. Different from FIG. 3, FIG. 11 shows a channel coding unit 304-1 for CQI, a channel coding unit 304-2 for acknowledgement, and a coding bit multiplexing unit 305.

The channel coding unit 304-1 for CQI performs channel-coding on channel state information, and outputs coded data. As the coding, proper various schemes can be used such as convolution coding, Turbo coding, Reed-Muller coding and the like.

The channel coding unit 304-2 for acknowledgement iterates a bit indicating acknowledgement information a predetermined number of times, and output it. For example, when the acknowledgement information is represented as "1", the coding unit 304-2 iterates it four times, for example, to output "1111". The number of times of iteration can be adjusted as necessary.

The coding bit multiplexing unit 350 multiplexes the coded signal, and provides the multiplexed signal to the block-by-block modulation pattern generation unit 306.

Accordingly, in the second embodiment of the present invention, each of the acknowledgement information and the channel state information is coded separately. In order to improve error rate for the acknowledgement information, the acknowledgement information is multiplexed after it is iterated a plurality of times.

The block-by-block modulation pattern generation unit 306 determines correspondence relationship between one or more of 12 blocks (LB1-LB2) in the subframe and the bits representing channel state information (CQI), and determines correspondence relationship between one or more of 12 blocks (LB1-LB2) in the subframe and the bit representing acknowledgement information (ACK/NACK).

Figure 12:
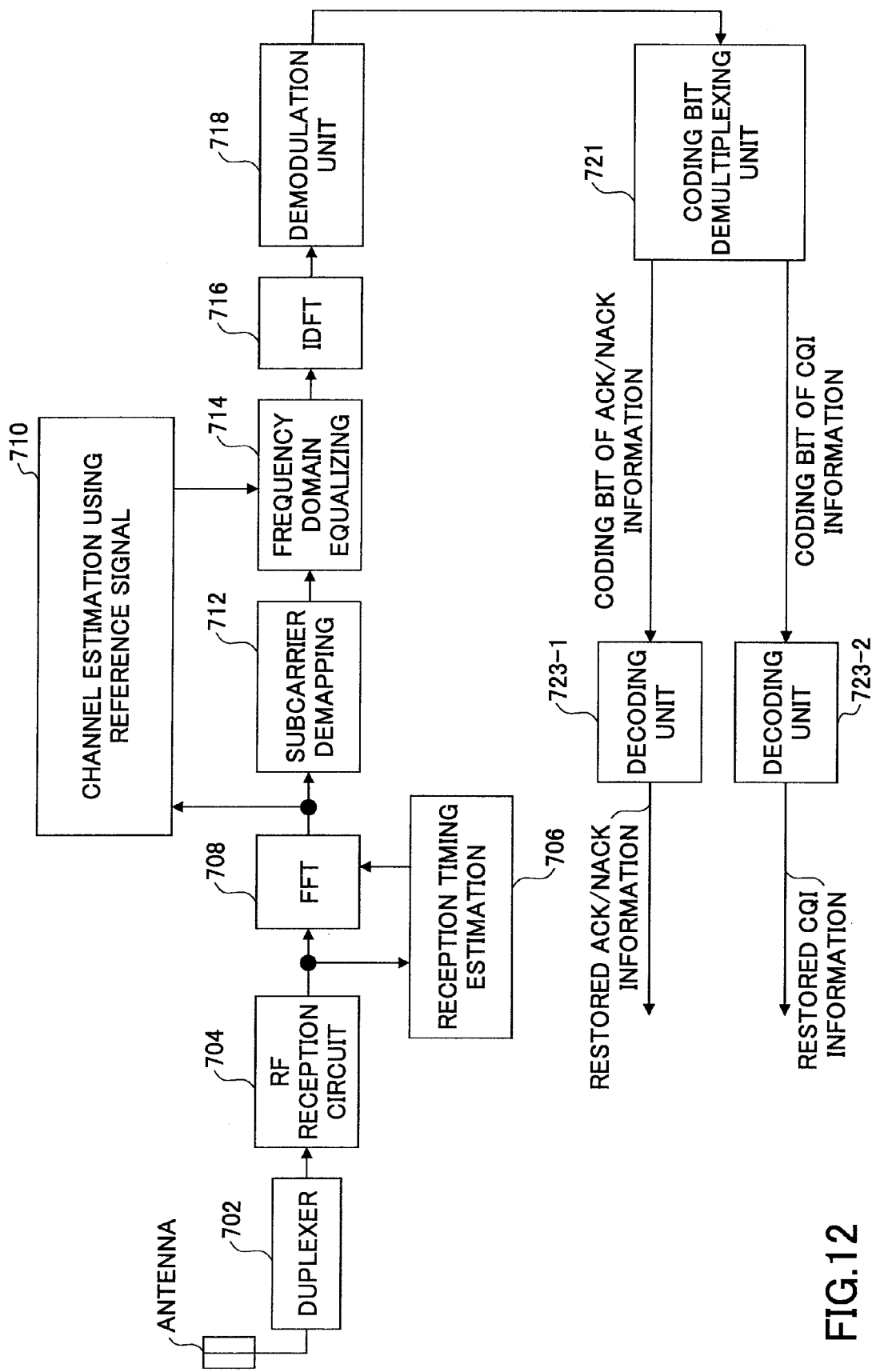
FIG. 12 shows a block diagram of the base station apparatus according to the second embodiment of the present invention.

FIG. 12 shows a block diagram of the base station apparatus according to a second embodiment of the present invention. Generally, FIG. 12 is similar to FIG. 6 in which same reference numbers are assigned to the same processing blocks, and repeated description is not given. Different from FIG. 6, FIG. 12 shows a coding bit demultiplexing unit 721, a decoding unit 723-1 for acknowledgement information, and decoding unit 723-2 for channel state information.

The coding bit demultiplexing unit 721 separates a control signal into acknowledgement information and channel state information.

The decoding unit 723-1 for acknowledgement information decodes acknowledgement information. However, it should be noted that merely same bits are transmitted iteratively as the acknowledgement information.

The decoding unit 732-2 for the channel state information decodes channel state information.

By using the uplink control channel, the user apparatus transmits only channel state information, transmits only acknowledgement information, or transmits both of them. Therefore, (A) all of the 12 blocks may be associated with the acknowledgement information, (B) all of the 12 blocks may be associated with the channel state information, or (C) a part of the 12 blocks are associated with the channel state information and the remaining part of the blocks may be associated with the acknowledgement information. In any way, based on the correspondence relationship, one factor is prepared for each of the 12 blocks, so that 12 factors (first factor-twelfth factor) are prepared in total per one TTI.

Figure 13:
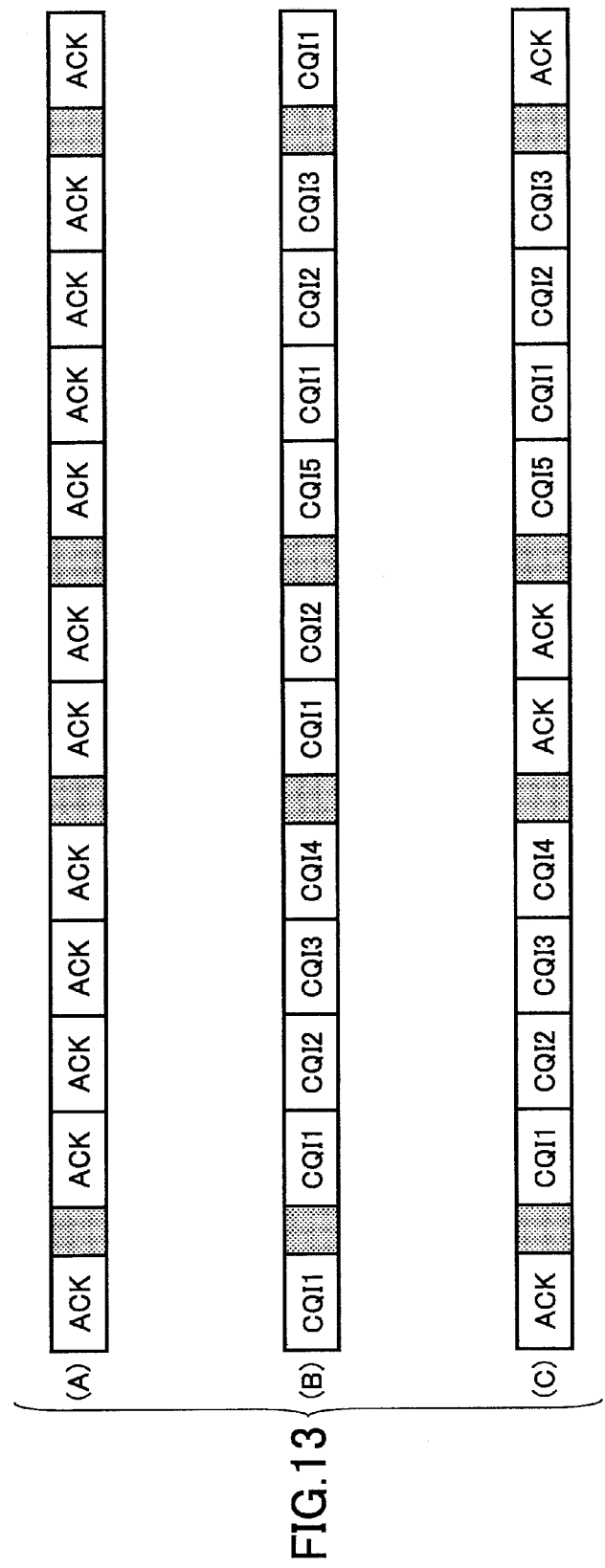
FIG. 13 is a diagram showing a concrete example of information by which long blocks are multiplied.

FIG. 13 shows a concrete example of factors associated with long blocks. In (A) shown in the figure, a situation is shown in which only acknowledgement information (ACK/NACK) is transmitted. As an example, positive acknowledgement (ACK) or negative acknowledgement (NACK) may be represented by various patterns. For example, ACK/NACK may be distinguished by using one factor, ACK/NACK may be distinguished by using two factors such as (+1, +1) and (+1, −1), or ACK/NACK may be distinguished by using more factors. Although it is the simplest determination method to identify ACK/NACK using one factor, it is preferable to distinguish ACK/NACK by using phase change of a plurality of factors, from the viewpoint of improving determination accuracy. The factor is not limited to ±1, and generally, arbitrary complex numbers can be used as the factor. However, it is advantageous to use ±1 as the factor, in that calculation can be performed by simple sign inversion. The reason is that, as long as all chips of the CAZAC code sequence in the block are multiplied by the same factor, orthogonality can be maintained.

In the example shown in (B), a situation is shown in which only channel state information (CQI) is transmitted. In the example shown in the figure, CQI is represented by five bits, and the bits are represented as CQI1, CQI2, CQI3, CQI4, and CQI5 in order beginning from the highest-order bit. One long block can be associated with a bit of the five bits. In other words, the factor prepared for each of the 12 blocks is one of CQI1-CQI5. In the example shown in the figure, the bit assignment is designed such that the number of transmission times of higher-order bits is equal to or greater than the number of transmission times of lower-order bits in one TTI. The highest-order bit CQI1 is assigned to four blocks, CQI2 is assigned to three blocks, CQI3 is assigned to two blocks, CQI4 is assigned to two blocks, and the lowest-order bit CQI5 is assigned to one block. By configuring like this, even though an error occurs, the value of CQI is not largely changed as much as possible.

In the example shown in (C), a situation is shown in which acknowledgement information (ACK/NACK) and channel state information (CQI) are transmitted from a same user using a same TTI. In the example shown in the figure, four blocks are associated with acknowledgement information (ACK/NACK) and the remaining eight blocks are associated with channel state information (CQI). Even when a same user transmits acknowledgement information (ACK/NACK) and channel state information (CQI), if a plurality of TTIs can be used, the methods of (A) or (B) may be used. In addition, when channel state becomes worse as compared with original channel state, which corresponds to a case for a user who moves from the center of the cell to an end of the cell, the user apparatus may stop reporting CQI so that the user apparatus may perform only feedback of ACK/NACK. What information should be transmitted by using the uplink control channel may be properly changed by using upper layer signaling, for example.

As mentioned above, the block-by-block modulation pattern generation unit 306 prepares one factor for each of the 12 blocks, so that 12 factors (first factor-twelfth factor) are prepared in total per one TTI.

FIG. 14 schematically shows how the acknowledgement information and the channel state information are processed in the second embodiment of the present invention. Different from the first embodiment, the acknowledgment information and the channel state information are channel-coded separately in the second embodiment. As for the acknowledgement information, redundancy is increased by iterating it a predetermined number of times. The power (power density per unit band) for the acknowledgement information and the channel state information is individually adjusted. In the example shown in the figure, the power of the acknowledgement information is set to be greater than the power of channel state information in order to enhance quality of the acknowledgement information.

According to the present embodiment, as for the channel sate information, it can be exacted to obtain an error rate similar to conventional one. As to the acknowledgement information, an effect can be expected to improve the error rate according to redundancy by iteration. By the way, puncturing may be performed in order to adjust transmission rate or quality. In the present embodiment, since the channel state information and the acknowledgement information are processed separately, it can be performed relatively easily to perform puncturing and power adjustment only for bits of CQI, and to perform puncturing and power adjustment only for lower-order bits of CQI.

In the present embodiment, as shown in FIG. 13, the base station needs to distinguish three kinds of signal formats. In this case, if the base station fails to identify the formats of (A) and (B), the base station cannot extract a significant signal. However, if the base station fails to identify the formats of (A) and (C), the base station can receive the acknowledgement information correctly at least. In addition, if the base station fails to identify the formats of (B) and (C), the base station can receive a large part of the channel state information correctly at least. In other words, for realizing the above-mentioned processing, it is preferable that redundancy bits (higher-order redundancy bits) the number of which is larger than others are mapped to blocks to which ACK/NACK may be mapped.

For example, assuming that the user apparatus receives the downlink L1/L2 control signal incorrectly and that a downlink data signal to the user apparatus is not demodulated in the user apparatus, the user apparatus cannot even know that the downlink data signal exists. In this case, the base station expects the uplink control signal (A) or (C) including ACK/NACK. Since timing of reporting CQI is known, whether the uplink signal should be (A) or (C) is known. Since the user apparatus does not know even the existence of the downlink data signal, the user apparatus reports CQI using the format of (B) at a next CQI reporting timing. As a result, although the base station expects the format of (C), the user apparatus transmits the uplink control signal using the format of (B). Even in such a case, if the base station successfully receives eight blocks relating to CQI, the base station can receive CQI correctly.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment is not essential in the present invention, and equal to or more than two embodiments may be used as necessary. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-073730, filed in the JPO on Mar. 20, 2007, and the entire contents of the Japanese patent application No. 2007-073730 is incorporated herein by reference.

The invention claimed is:

1. A user apparatus for transmitting an uplink control signal to a base station apparatus using a single carrier scheme, comprising
   an ACK/NACK determination unit configured to prepare acknowledgement information indicating positive acknowledgement or negative acknowledgement for a downlink data signal based on a result of demodulation of the downlink data signal;
   a CQI estimation unit configured to prepare channel state information indicating reception quality of a downlink reference signal;
   a multiplexing unit configured to multiplex the acknowledgment information and the channel state information, wherein the number of bits of the channel state information is greater than the number of bits of the acknowledgement information;
   a coding unit configured to collectively channel-code multiplexed control information in which the acknowledgement information and the channel state information are multiplexed;
   a modulation unit configured to generate an uplink control signal based on the multiplexed control information that is channel-coded by the coding unit; and a transmission unit configured to transmit the uplink control signal using dedicated resources different from resources for an uplink data signal, wherein the multiplexing unit performs multiplexing of the channel state information and the acknowledgement information so as to generate the multiplexed control information having a length that is equal to the sum of the number of bits of the acknowledgement information and the channel state information in which plural bits for representing the channel state information remain continuous.

2. The user apparatus as claimed in claim 1, wherein the uplink control signal includes a plurality of unit block sequences each of which is obtained by multiplying all chips of an orthogonal code sequence for the user apparatus by a same factor.

3. The user apparatus as claimed in claim 2, wherein the factor by which each of the unit block sequence is multiplied represents the acknowledgement information or the channel state information.

4. A method used in a user apparatus for transmitting an uplink control signal to a base station apparatus using a single carrier scheme, comprising a step of multiplexing acknowledgement information indicating positive acknowledgement or negative acknowledgement for a downlink data signal and channel state information indicating reception quality of a downlink reference signal, wherein the number of bits of the channel state information is greater than the number of bits of the acknowledgement information;

a step of collectively channel-coding multiplexed control information in which the acknowledgement information and the channel state information are multiplexed;

a step of generating an uplink control signal based on the multiplexed control information that is channel-coded; and a step of transmitting the uplink control signal using dedicated resources different from resources for an uplink data signal, wherein the step of multiplexing performs multiplexing of the channel state information and the acknowledgement information so as to generate the multiplexed control information having a length that is equal to the sum of the number of bits of the acknowledgement information and the channel state information in which plural bits for representing the channel state information remain continuous.

5. A communication system, comprising a user apparatus for transmitting an uplink control signal using a single carrier scheme; and a base station apparatus for receiving the uplink control signal from the user apparatus, the user apparatus comprising:

an ACK/NACK determination unit configured to prepare acknowledgement information indicating positive acknowledgement or negative acknowledgement for a downlink data signal based on a result of demodulation of the downlink data signal;

a CQI estimation unit configured to prepare channel state information indicating reception quality of a downlink reference signal;

a multiplexing unit configured to multiplex the acknowledgement information and the channel state information, wherein the number of bits of the channel state information is greater than the number of bits of the acknowledgement information;

a coding unit configured to collectively channel-code multiplexed control information in which the acknowledgement information and the channel state information are multiplexed;

a modulation unit configured to generate an uplink control signal based on the multiplexed control information that is channel-coded by the coding unit; and a transmission unit configured to transmit the uplink control signal using dedicated resources different from resources for an uplink data signal, wherein the multiplexing unit performs multiplexing of the channel state information and the acknowledgement information so as to generate the multiplexed control information having a length that is equal to the sum of the number of bits of the acknowledgement information and the channel state information in which plural bits for representing the channel state information remain continuous.

* * * * *